United States Patent Office 3,808,238
Patented Apr. 30, 1974

3,808,238
PROCESS FOR 11-AMINO-9,10-
ETHANOANTHRACENES
Walton J. Hammar and Mark A. Rustad, St. Paul, Minn., assignors to Riker Laboratories, Inc., Northridge, Calif.
No Drawing. Filed June 18, 1973, Ser. No. 371,186
Int. Cl. C07c 79/46
U.S. Cl. 260—396 N                                                8 Claims

ABSTRACT OF THE DISCLOSURE

The reaction of anthracene with either a trans-beta-nitroacrylic ester or an alpha-halo-beta nitropropionic ester provides a novel trans-12-carboalkoxy-11-nitro-9,10-dihydro-9,10-ethanoanthracene. The nitro group of this intermediate is selectively reduced to provide a trans-11-amino-12-carboalkoxy - 9,10 - dihydro - 9,10-ethanoanthracene, a valuable intermediate for the preparation of pharmacologically active compounds.

BACKGROUND OF THE INVENTION

This invention relates to novel intermediate useful for preparation of pharmacologically active 10,11-dihydro-12-(substituted aminoalkyl)-5,10-methano - 5H - dibenzo[a,d]cycloheptenes and to a process for their preparation.

References useful to show the state of the art include S. Wawzonek et al., J. Org. Chem. 18, 288 (1953); W. R. Vaughan et al., J. Am. Chem. Soc., 80, 1956 (1958), C.A., 61, 6971f, thesis of D. E. Plorde and C.A., 61, 14551, thesis of J. Mohrig.

The compound 12-carboxy-10,11-dihydro - 5,10 - methano-5H-dibenzo[a,d]cycloheptene (I) is a known intermediate compound in a process for preparation of pharmacologically active 10,11-dihydro-12-(substituted aminoalkyl)-5,10-methano-5H-dibenzo[a,d]cycloheptenes (see U.S. patent application Ser. No. 194,056, German Offenlegungschrift 2,216,884).

The process of the present invention provides a route for preparation of trans-11-amino-12-carboalkoxy-9,10-dihydro-9,10-ethanoanthracene which can be converted in two further steps to 12-carboxy-10,11-dihydro-5,10-methano-5H-dibenzo[a,d]cycloheptene.

9,10-dihydro-9,10-ethanoanthracenes substituted both at the 11-position by a nitro group and at the 12-position by a carboalkoxy group are not believed to have been reported previously. Both of these substituents are essential in the process of the project invention.

DETAILED DESCRIPTION OF THE INVENTION

This invention relates to a process wherein anthracene is reacted with either a trans-beta-nitroacrylic ester or an alpha-halo-beta-nitropropionic ester to provide a novel trans-12-carbo-lower alkoxy - 11-nitro-9,10-dihydro-9,10-ethanoanthracene. The nitro group of this intermediate is then selectively reduced to provide a trans-11-amino-12-carboalkoxy-9,10-dihydro - 9,10 - ethanoanthracene. The process is shown in the following equations

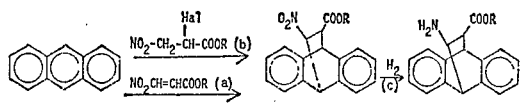

wherein Hal is bromine or chlorine, preferably chlorine and R is lower alkyl (i.e., alkyl having 1 to 6 carbon atoms), preferably methyl or ethyl.

Step (a) is carried out by heating the reactants in an inert solvent at a temperature in the range of 60 to 150° C. (for example conveniently at the reflux temperature of the solvent) using solvents such as an aromatic hydrocarbon, for example benzene, toluene or a xylene, an alkyl hydrocarbon such as n-octane or n-decane, a halocarbon such as trichloroethylene, chlorobenzene, and the like.

Step (b) is an alternative to step (a) and is carried out by heating in the same temperature range the reactants in an inert solvent such as those suitable for step (a) in the presence of an acid acceptor, either inorganic such as metal hydroxides, carbonates and the like or (and preferably) organic such as amines (primary, secondary or tertiary) or metal salts of organic acids; presently preferred is sodium acetate.

The intermediate nitro-substituted compounds produced by step (a) or (b) are reduced catalytically in step (c) under moderate to high pressures (about 3 to 67 atmospheres) of hydrogen gas at a temperature in the range of 25 to 100° C. to provide trans-11-amino-12-carboalkoxy-9,10-dihydro - 9,10 - ethanoanthracenes. Solvents such as alcohols, for example methanol (preferably), ethanol, and the like, esters, for example ethyl acetate, organic acids, for example acetic acid and the like are used. It is presently preferred to use a solvent system consisting of methanol and a small amount of acetic acid as an acidic cosolvent.

The presently preferred catalyst for reduction is palladium on charcoal. Other suitable catalysts are Raney nickel, platinum oxide and the like.

Chemical reduction by the use of agents which do not reduce the carboalkoxy group are also useful. In this procedure, aluminum amalgam, iron and acid (HCl) and the like are suitable. It is preferred, but not required, that the carboalkoxy group is not hydrolyzed.

The 11-amino compound is generally isolated after reduction in the form of an acid addition salt such as the hydrochloride (preferably), phosphate, acetate, sulfate and the like. It is suitable for use as an intermediate to be further reacted to provide the pharmacologically active 10,11-dihydro-12-(substituted aminoalkyl)-5,10-methano-5H-dibenzo[a,d]cycloheptenes and their salts.

For this purpose, the trans-11-amino-12-carboalkoxy-9,10-dihydro-9,10-ethanoanthracene is treated with nitrous acid in a protic solvent such as an alkanoic acid, an alcohol or inorganic acid (preferably acetic acid). The product is rearranged to 11-acetoxy-trans - 12 - carboalkoxy-10,11-dihydro-5,10-methano - 5H - dibenzocycloheptene. Without purification, this product is reduced by hydrogenation using a catalyst, e.g., palladium on charcoal to form the known compound 12-anti-carboxy-10,11-dihydro - 5,10-methano-5H-dibenzo[a,d]cycloheptene. Details of these steps are described in the copending application of Walton J. Hammar, filed of even date herewith, Ser. No. 371,118 (attorney's file No. 50065).

Useful 10,11-dihydro - 12 - (substituted aminoalkyl)-5,10-methano - 5H - dibenzo[a,d]cycloheptenes can be prepared from the 12-carboxy compound, as described in German Offenlegungschrift 2,216,884 or U.S. patent application Ser. No. 194,056, filed Oct. 29, 1971.

The following examples are provided to illustrate preparation of the compounds of the invention and their salts, and are not intended to be limiting of the invention described hereinabove.

EXAMPLE 1

A mixture containing 73 g. (0.44 mole) of methyl alpha-chloro-beta-nitropropionate, 66.0 g. (0.37 mole) of anthracene 36.0 g. (0.44 mole) of anhydrous sodium acetate is refluxed in 1500 ml. of toluene. Brown fumes appear in the condenser after about 45 minutes. Refluxing is continued overnight. The reaction mixture is then filtered and the toluene is evaporated leaving a dark brown viscous oil, 124.8 g. The infrared and nuclear magnetic resonance spectra are consistent with the structure of the compound 12-carbomethoxy-11-nitro-9,10-dihydro-9,10-ethanoanthracene.

The nuclear magnetic resonance spectrum of the compound trans-12-carbomethoxy-11-nitro-9,10-dihydro-9,10-ethanoanthracene has been measured in deuterochloroform and peaks were found at 5.29, 3.76, 3.59, 4.78 and 5.06τ and were consistent with and assigned to the nonaromatic protons of the compound.

The infrared spectrum of said compound was also measured and was consistent with the assigned structure, showing absorptions at 5.72 microns assigned to the carbomethoxy carbonyl and 6.4 microns assigned to the nitro group.

EXAMPLE 2

Alternative procedure for making 11-nitro compound

Anthracene (1.7 g.) and methyl trans-beta-nitroacrylate (1.3 g.) are placed in 25 ml. of toluene and the mixture is heated at its reflux temperature for about 15 hours. The solution is washed with 25 ml. of saturated sodium chloride solution, then dried over anhydrous magnesium sulfate. Evaporation of the toluene solution under vacuum provides the crude product. Elution chromatography on silica gel is used to purify the compound. The nuclear magnetic resonance spectrum of the product is identical with that of the product from Example 1.

EXAMPLE 3

About 5.0 g. of the crude product of Example 1 are hydrogenated (200 p.s.i., 40°, 16 hours) in 100 ml. of methanol containing 5 ml. of acetic acid and 0.5 g. of 10% palladium on charcoal. The catalyst is removed by filtration and the solvent is removed by evaporation under reduced pressure leaving a yellow oil. This is partitioned between 150 ml. of 3 N hydrochloric acid and 100 ml. of chloroform. The pale yellow aqueous layer is basified using saturated sodium carbonate solution. The resulting mixture is extracted twice with 200 ml. portions of chloroform and the combined chloroform extracts are dried over calcium sulfate. Evaporation of the chloroform leaves the product as a pale yellow oil. The crystalline hydrochloride (1.2 g.) is obtained by treating the extract with a solution of hydrochloric acid in diethyl ether and filtering off the precipitated salt, and the structure of the product is assigned based on its infrared and nuclear magnetic resonance spectra and elemental analysis.

Recrystallization of trans-11-amino-12-carbomethoxy-9,10 - dihydro - 9,10 - ethanoanthracene hydrochloride from an isopropanol-isopropyl ether mixture provides the pure salt, M.P. 260–262° C. (dec.).

*Analysis.*—Calculated for $C_{18}N_{17}NO_2HCl$ (percent): C, 68.5; H, 5.75; N, 4.44. Found (percent): C, 68.8; H, 5.7; N, 4.3.

EXAMPLE 4

Using the method of Example 2, ethyl trans-alpha-bromo-beta-nitropropionate is reacted with anthracene at the reflux temperature of o-xylene in the presence of trimethylamine to provide 12-carboethoxy - 11 - nitro-9,10-dihydro - 9,10 - ethanoanthracene. This compound is reduced by the process of Example 3 to yield the corresponding trans-11-amino - 12 - carboethoxy - 9,10 - dihydro-9,10-ethanoanthracene in the form of the hydrochloride salt.

What is claimed is:

1. Process for preparation of trans - 11 - amino - 12-carboalkoxy - 9,10 - dihydro - 9,10 - ethanoanthracene which comprises treating anthracene with a lower alkyl-α-halo-β-nitropropionate or a lower alkyl-β-nitroacrylate in inert solvent solution at a temperature in the range of 60 to 150° C. to form a trans-12-carboalkoxy-11-nitro - 9,10 - dihydro - 9,10 - ethanoanthracene, and reducing the latter product catalytically under pressure of about 3 to 67 atmospheres of hydrogen gas at a temperature in the range of about 25 to 100° C.

2. Process according to claim 1, in which the nitro ester employed is a methyl ester.

3. Process according to claim 1, in which the nitro ester employed is an ethyl ester.

4. Process according to claim 1 in which the nitro ester is methyl-α-chloro-β-nitropropionate.

5. Process according to claim 1, in which the nitro ester is methyl-trans-β-nitroacrylate.

6. Trans - 12 - carbo-lower alkoxy - 11 - nitro - 9,10-dihydro-9,10-ethanoanthracene.

7. Trans - 12 - carbomethoxy - 11 - nitro - 9,10 - dihydro-9,10-ethanoanthracene according to claim 6.

8. Trans - 12 - carboethoxy - 11 - nitro - 9,10 - dihydro-9,10-ethanoanthracene according to claim 6.

References Cited

UNITED STATES PATENTS 3,423,425   1/1969   Wilhelm _____ 260—570.8 TC

OTHER REFERENCES

Chem. Abstracts, 63:14789d.
Chem. Abstracts, 59:439f.
Chem. Abstracts, 54:21012i.

VIVIAN GARNER, Primary Examiner

U.S. Cl. X.R.

260—473 F, 501.1, 515 R, 570.8 TC